US009547581B2

(12) United States Patent
Bhattacharya (10) Patent No.: US 9,547,581 B2
(45) Date of Patent: Jan. 17, 2017

(54) SYSTEMS AND METHODS FOR FIXING SOFTWARE DEFECTS IN A BINARY OR EXECUTABLE FILE

(71) Applicant: Sourav Sam Bhattacharya, Fountain Hills, AZ (US)

(72) Inventor: Sourav Sam Bhattacharya, Fountain Hills, AZ (US)

(73) Assignee: WIPRO LIMITED, Bangalore (IN)

( * ) Notice: Subject to any disclaimer, the term of this patent is extended or adjusted under 35 U.S.C. 154(b) by 324 days.

(21) Appl. No.: 14/043,338

(22) Filed: Oct. 1, 2013

(65) Prior Publication Data

US 2015/0095887 A1    Apr. 2, 2015

(51) Int. Cl.
*G06F 11/36* (2006.01)

(52) U.S. Cl.
CPC .......... *G06F 11/362* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 5,450,586 A * | 9/1995 | Kuzara et al. | 717/124 |
| 6,263,456 B1 * | 7/2001 | Boxall et al. | 714/31 |
| 6,311,326 B1 | 10/2001 | Shagam | |
| 6,594,822 B1 | 7/2003 | Schweitz et al. | |
| 6,760,908 B2 | 7/2004 | Ren | |
| 7,249,247 B2 | 7/2007 | See et al. | |
| 7,296,189 B2 | 11/2007 | Day et al. | |
| 7,475,286 B2 | 1/2009 | Altaf et al. | |
| 7,555,744 B2 * | 6/2009 | Chkodrov et al. | 717/124 |
| 7,571,437 B2 | 8/2009 | Tanno et al. | |
| 7,577,879 B2 | 8/2009 | Lantz et al. | |

(Continued)

FOREIGN PATENT DOCUMENTS

JP    H05-053870    5/1993
WO    WO 2005/114240 A1    12/2005

OTHER PUBLICATIONS

Koskinen, "Isolating events for black box tracing", ACM, 2008, pp. 191-203.*

*Primary Examiner* — Isaac T Tecklu
(74) *Attorney, Agent, or Firm* — Finnegan, Henderson, Farabow, Garrett & Dunner, LLP (57) ABSTRACT

This disclosure relates generally to application development, and more particularly to systems and methods for fixing software defects in a binary or executable file. In one embodiment, a software defect management system is disclosed, comprising: a processor; and a memory disposed in communication with the processor and storing processor-executable instructions comprising instructions for: obtaining an application programming interface call for a black-box software application; determining whether the black-box software application is configured in a defective manner to process the application programming interface call; identifying a call processing application to process the application programming interface call, based on determining whether the black-box software application is configured in a defective manner to process the application programming interface call; and providing the application programming interface call for the identified call processing application.

19 Claims, 7 Drawing Sheets

Example Computer System (56) References Cited

U.S. PATENT DOCUMENTS

| | | | |
|---|---|---|---|
| 7,617,423 B2 | 11/2009 | Patel et al. | |
| 8,190,322 B2 | 5/2012 | Lin et al. | |
| 8,214,798 B2 | 7/2012 | Bellucci et al. | |
| 8,776,026 B2 * | 7/2014 | Candea et al. | 717/126 |
| 8,789,020 B2 * | 7/2014 | Chung et al. | 717/125 |
| 2003/0056200 A1 | 3/2003 | Li et al. | |
| 2011/0225575 A1 | 9/2011 | Ningombam et al. | |
| 2011/0296246 A1 * | 12/2011 | Cooper et al. | 714/38.1 |
| 2013/0061226 A1 | 3/2013 | Ammons et al. | |

* cited by examiner

FIG. 1: Example middleware switch solution for software defect management

FIG. 2: Example middleware switch solution architecture

FIG. 3: Example middleware switch initialization flowchart

FIG. 4A: Example middleware switch operation flowchart

FIG. 4B: Example middleware switch operation flowchart

FIG. 4C: Example middleware switch operation flowchart

FIG. 5: Example Computer System

SYSTEMS AND METHODS FOR FIXING SOFTWARE DEFECTS IN A BINARY OR EXECUTABLE FILE

TECHNICAL FIELD

This disclosure relates generally to application development, and more particularly to systems and methods for fixing software defects in a binary or executable file.

BACKGROUND

A software product typically goes through a software development life-cycle (SDLC), including, among other things, software programming or coding followed by software testing. The reliability and quality of a software impacts customer satisfaction and sales in a competitive business environment. Features like reliability, security and quality are attributed to a software when it does not have any defects or bugs. Such defects or bugs can cause feature lapse or accrue undesired deficiency.

Typically, in scenarios where a user commercially exploits software and experiences undesired functionality or defects in it, the user has to live with it or wait for the original vendor to fix it. If the defect or bug is detected before the software is deployed then the creator of the software may fix it, but if the defects are detected post-deployment (especially to a large number of users), then fixing the defects in the "already-deployed" version is challenging. When the Defects or bugs are fixed using software patches, plug-ins, or wrapper solutions. Each of these is appropriate to specific scenarios. Patches correct the defects replacing the defective portion with a corrected code. Patches are typically authored by the same source as the original software development team. Effective and efficient patches do not come from a third party, since third parties have little to no knowledge about the internal workings of the original defective software.

Wrapper solutions push the correct code into defective software, and deactivate or encapsulate the defective portion. Plug-ins tend to introduce enhancements into a software rather than actually fixing a defect in the software. Plug-ins are usually from third parties, but they do not fix software defects. Developing wrappers and plug-ins both require knowledge of the internal structure of the defective software.

SUMMARY

In one embodiment, a software defect management system is disclosed, comprising: a processor; and a memory disposed in communication with the processor and storing processor-executable instructions comprising instructions for: obtaining an application programming interface call for a black-box software application; determining whether the black-box software application is configured in a defective manner to process the application programming interface call; identifying a call processing application to process the application programming interface call, based on determining whether the black-box software application is configured in a defective manner to process the application programming interface call; and providing the application programming interface call for the identified call processing application.

In one embodiment, a software defect management method is disclosed, comprising: obtaining an application programming interface call for a black-box software application; determining, via a processor, whether the black-box software application is configured in a defective manner to process the application programming interface call; identifying, via the processor, a call processing application to process the application programming interface call, based on determining whether the black-box software application is configured in a defective manner to process the application programming interface call; and providing the application programming interface call for the identified call processing application.

In one embodiment, a non-transitory computer-readable medium is disclosed, storing computer-executable software defect management instructions comprising instructions for: obtaining an application programming interface call for a black-box software application; determining, via a processor, whether the black-box software application is configured in a defective manner to process the application programming interface call; identifying, via the processor, a call processing application to process the application programming interface call, based on determining whether the black-box software application is configured in a defective manner to process the application programming interface call; and providing the application programming interface call for the identified call processing application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
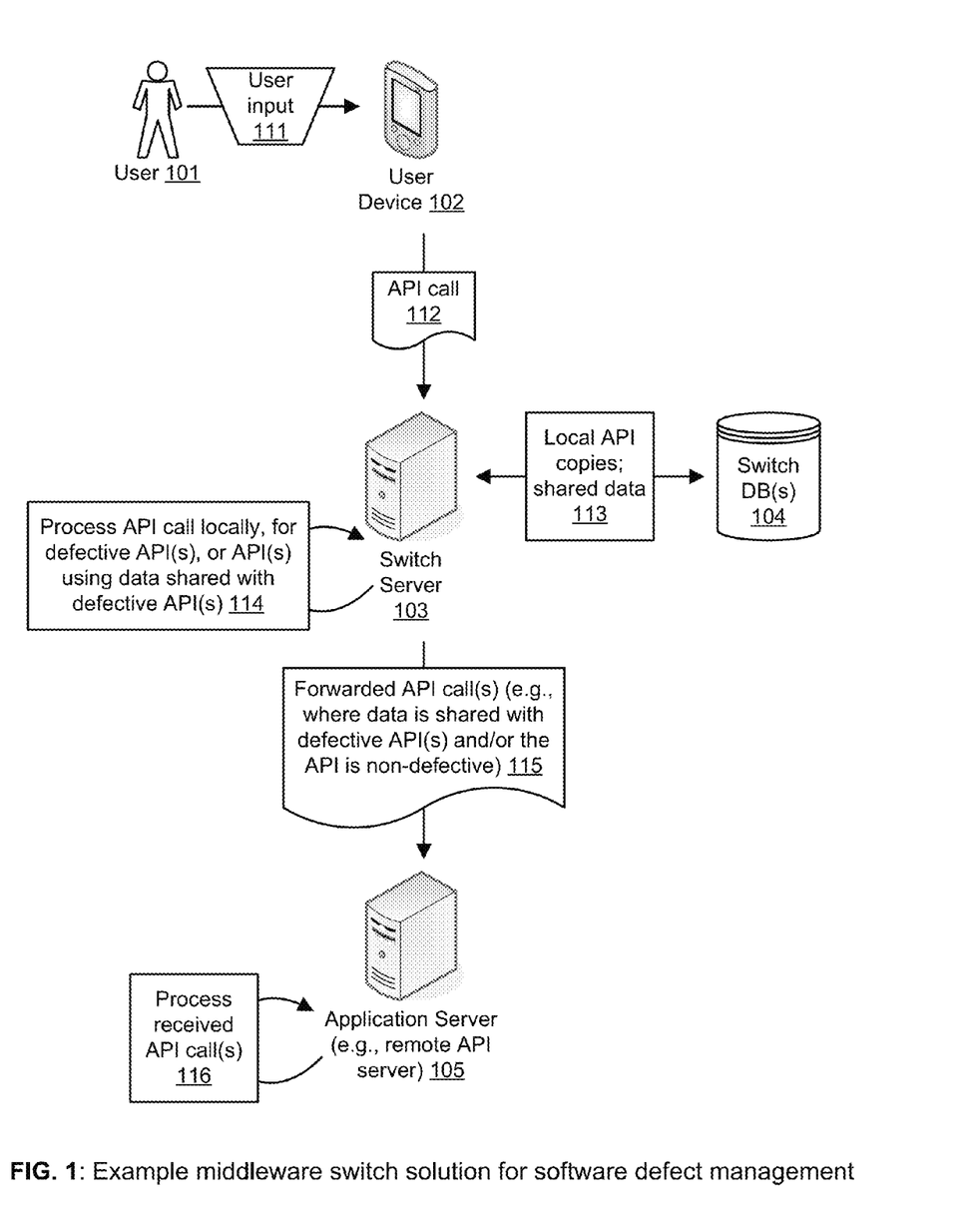
FIG. 1 illustrates an exemplary middleware switch system for software defect management, according to some embodiments.

FIG. 1 illustrates an exemplary middleware switch system for software defect management, according to some embodiments. In some embodiments, a user 101 may provide input (see 111) into an application (e.g., an iPhone/iPad/Android app) executing on a user device 102 (e.g., a smartphone, tablet etc.). For example, the application may communicate with an application server 105 to provide an application feature for the user. The user device 102 may process the user input, and determine that it is required to make an application programming interface ("API") call 112 to the application server 105 to respond to the user input. Accordingly, the user device may generate an API call 112 to provide to the application server 105. In some embodiments, a switch server 103 may be provided that sits in-between the user device 102 and the application server 105. The switch server 103 may provide a value-added service, e.g., a service to fix certain defects or product anomalies at the application server 105. The switch server 103 may route APIs that are not defective, or those that utilize data that is shared with one or more defective API(s) (see 115), to the application server 105 for API call processing (see 116), but may capture the APIs that are defective and implement (see 114) a local (and, correct) implementation, e.g., stored in switch data base 104 (see 113), of the defective APIs, e.g., as an alternative in addition to potentially routing those APIs for processing to the application server 105 (e.g., when the API utilizes data that is shared with one or more defective API(s)).

Figure 2:
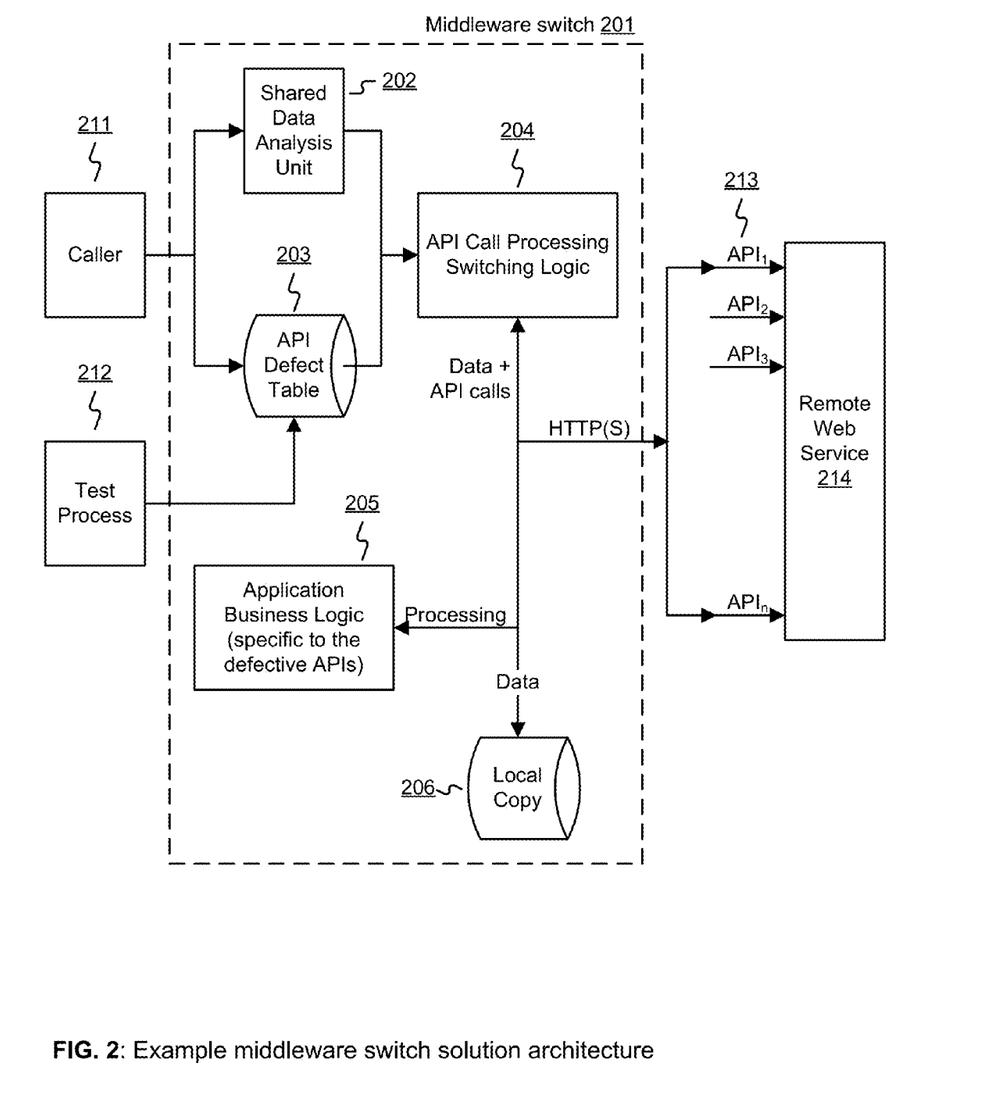
FIG. 2 is a functional block diagram of a middleware switch solution architecture example, according to some embodiments.

FIG. 2 is a functional block diagram of a middleware switch solution architecture example, according to some embodiments.

In some embodiments, a middleware switch 201 is provided, that may sit in-between a caller 211 and a remote web service 214. The middleware switch 201 may provide a value-added service, e.g., a service to fix certain defects or product anomalies at the remote web service 214. The middleware switch 201 may route APIs that are not defective directly to the remote web service 214, but may capture the APIs that are defective and implement a local (and, correct) implementation of the defective APIs, e.g., as an alternative to routing those APIs for processing to the remote web service 214.

In some embodiments, the caller module 211 may be an application that is configured to use the remote web service 214. The Caller module may be a third-party application that calls APIs in the remote web service 214. As an example, the remote web service 214 may implement accounting software, providing basic accounting functions as APIs. The caller module 211 may be an application that performs the payroll function of a business, which uses the accounting API calls. The caller module 211 may have access to the API specifications, but may be designed without knowledge of any internal design or code details of the remote web service 214.

In some embodiments, the remote web service 214 may be an external/third-party system, supporting a number (n) of APIs. These may be represented as API1, API2, . . . , APIn (see 213). They may be called over an HTTPS path (for secure connection) or HTTP (if security is not required). The remote web service 214 may offer certain basic business functions, which may be used by other applications to build and offer value-added services to end clients.

In some embodiments, a test process 212 may be provided to facilitate testing APIs to determine which are defective and which are not, and for initialization of the middleware switch 201. The outcome(s) of the test process 212 may indicate which APIs are defective (or, are perceived to be product anomalies and require one or more changes). The test process may be the output of a formal software test team deliverable. It may also be the output of a debug or triage operation. Any mechanism or method that provides a knowledge and tabulation regarding which APIs are working correctly or are defective may be utilized as a test process 212.

In some embodiments, the middleware switch 201 may include an API defect table 203 that captures a list of defective APIs, e.g., from the test process 212. In some implementations, the API defect table 203 may include a list of API names, e.g., with API syntax (e.g., list of in/out parameters) tabulated for each API. A more complex version is possible depending upon the implementation, wherein priority of the API defects may be factored in, or a defect may be differentiated to a product change request.

In some embodiments, a shared data analysis unit 202 may be provided, which handles API in/out parameter level data flow analysis. For example, one of the defective APIs may use data that is shared with one or more non-defective APIs. The shared data analysis unit 202 may facilitate taking control of all the shared data amongst the defective and non-defective APIs, and making sure that the appropriate data is provided for computations related to any defective or non-defective API.

In some embodiments, a local copy database 206 may be provided, which may serve as the local repository for all shared data. It may be used as a primary-database, making any database of the remote web service 214 serve instead as a shadow database. The primary database content (e.g., that of the local database 206) may take precedence, and Read/Write logic may be implemented to maintain the shadow database to be consistent to the content of the primary database.

In some embodiments, an application business logic module 205 may be provided, including features specific to each of the defective APIs. For example, every time the API call processing switching logic 204 refers to a local copy 206, the application business logic module 205 may be utilized to format the data stored in the local copy 206 such that it may be used by the API call processing switching logic 204. In some embodiments, the application business logic module 205 may implement a unitary transformation, e.g., 1:1 value translation—where the core Read/Write/Create functions may be executed as-is. For example, an inventory web database application may directly write the product-ID and price to the database without any value transformation. In a more complex product setting, the application business logic module 205 may be required to transform the price from one currency to another, or apply various discount policies depending on the merchant involved—which may not be a straight forward database read/write operation, but instead may require the application business logic module 205 to intervene.

Figure 3:
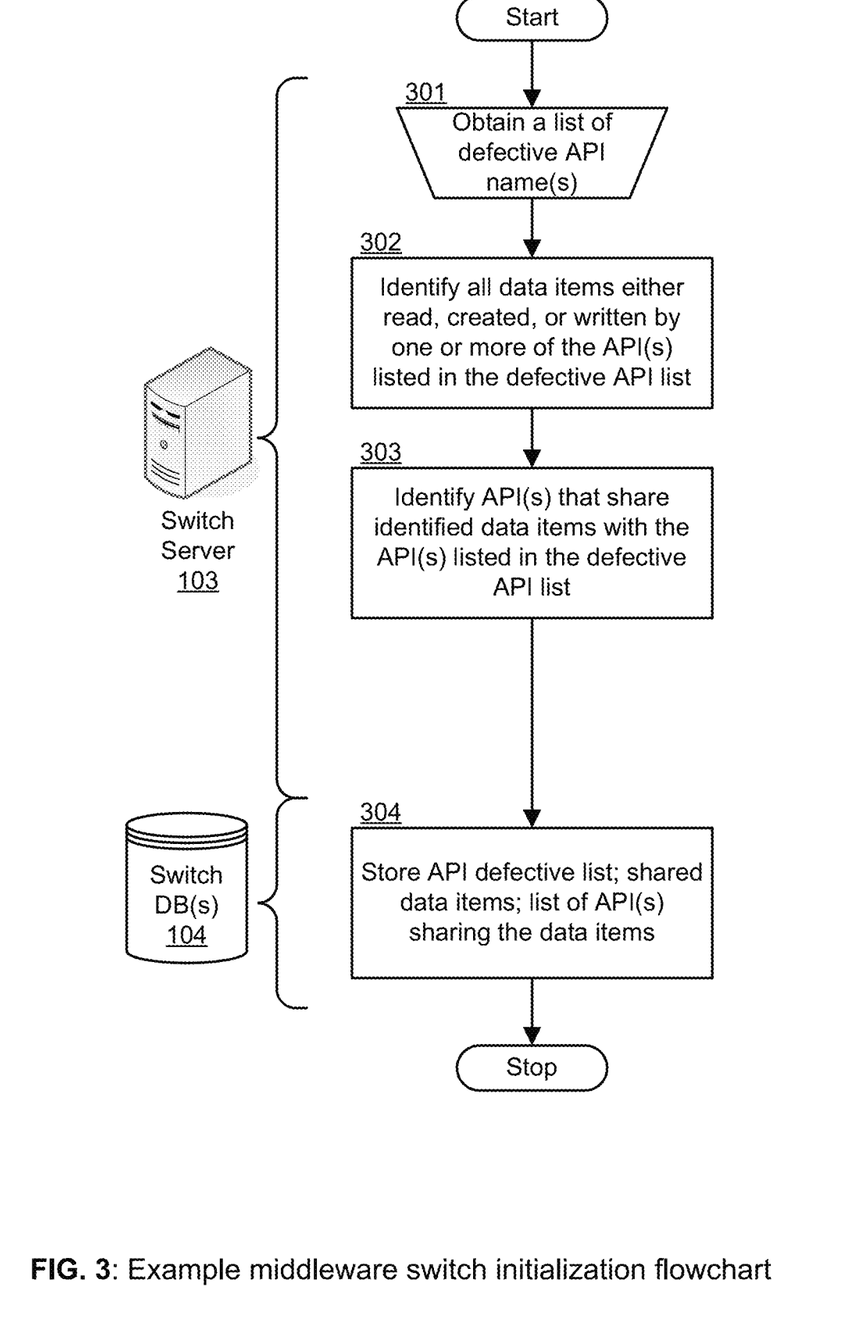
FIG. 3 illustrates an example middleware switch initialization flowchart in accordance with some embodiments.

FIG. 3 illustrates an example middleware switch initialization flowchart in accordance with some embodiments. In some embodiments, a switch server 103, implementing a middleware switch solution such as described above with reference to FIG. 2) may obtain a list of API name(s) that have been categorized as defective (see 301). In some embodiments, the switch server 103 may also obtain replacement local-copy APIs that are to be processed if the switch server 103 receives an API call corresponding to an API that is on the defect list. The switch server 103 may identify all data items that are either read, created, or written by the switch server 103 when processing one or more of the API(s) listed in the defect list (see 302). The switch sever 103 may also identify all APIs that share the identified shared data items with the APIs that are on the defect list (see 303). Using this information, the switch server may create an API defect table, such as shown in FIG. 2, 203. An example record within an API defect table is provided below:

TABLE I

Example API Defect Table Record

| Defective API Name | Shared Data Variables | | | APIs With Whom Data Shared | | |
|---|---|---|---|---|---|---|
| | Read | Write | Create | Read | Write | Create |
| Defect_API1 | Php_r1 Php_r2 | Php_wr1 Php_wr2 Php_wr3 | Php_cr1 | Defect_API2 API3 Clean_API1 | API2 | API41 Detect_API0 |

In some embodiments, the switch server 103 may store the obtained information, e.g., in the form of the API defect table, in switch database 104 (see 304).

Figure 4A:
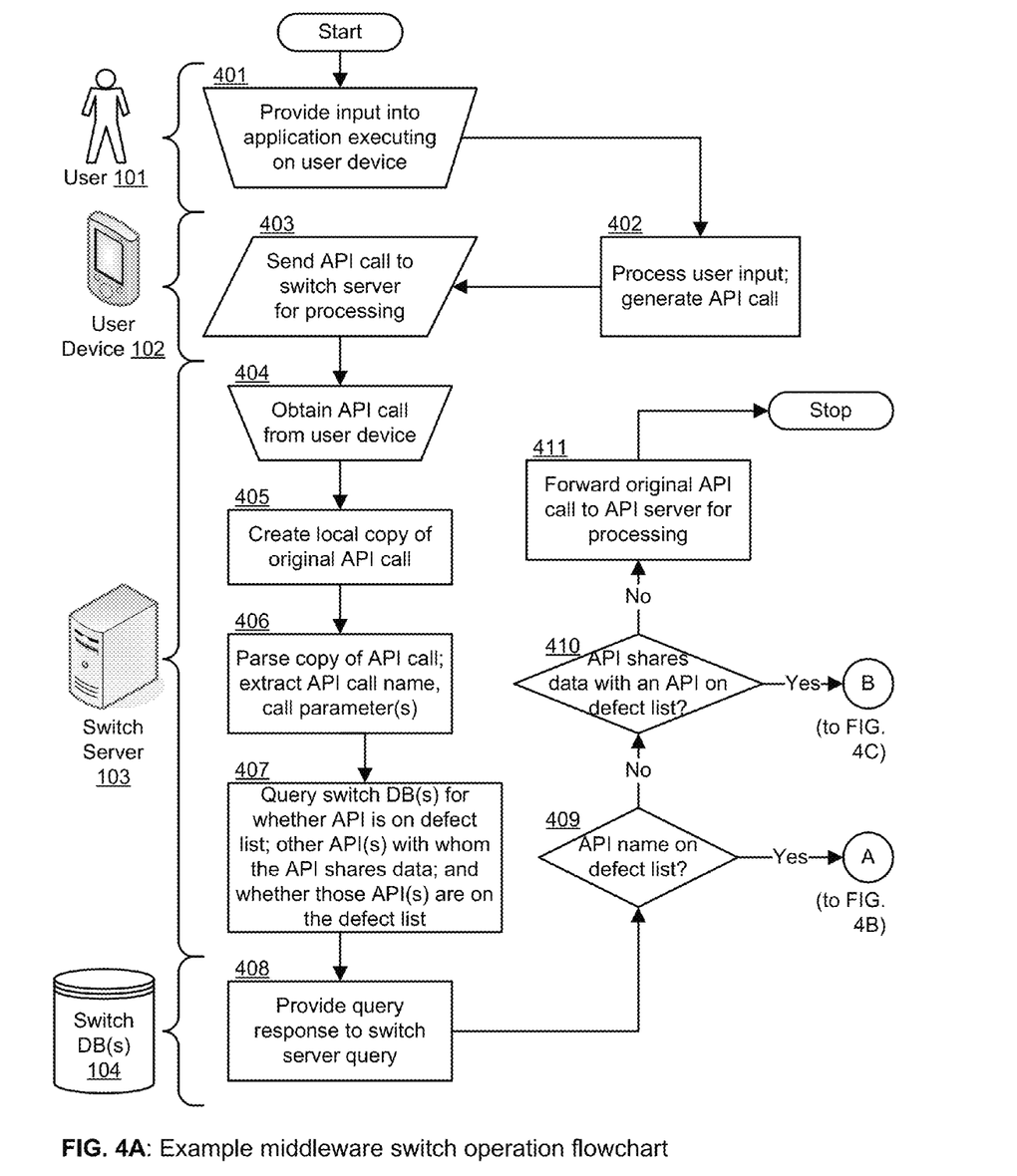
FIGS. 4A-4C illustrate an example middleware switch operation flowchart in accordance with some embodiments.
Figure 4B:
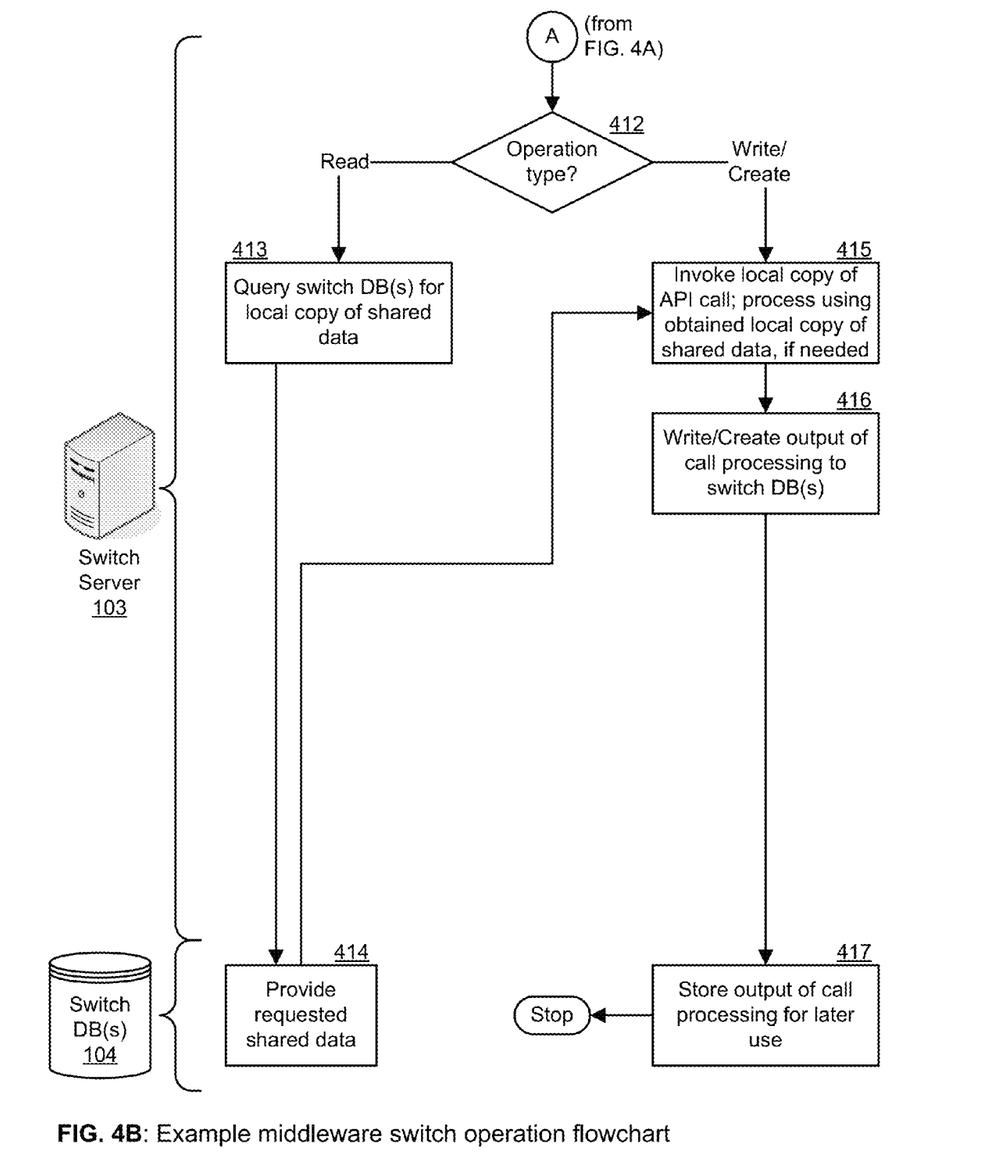
Figure 4C:
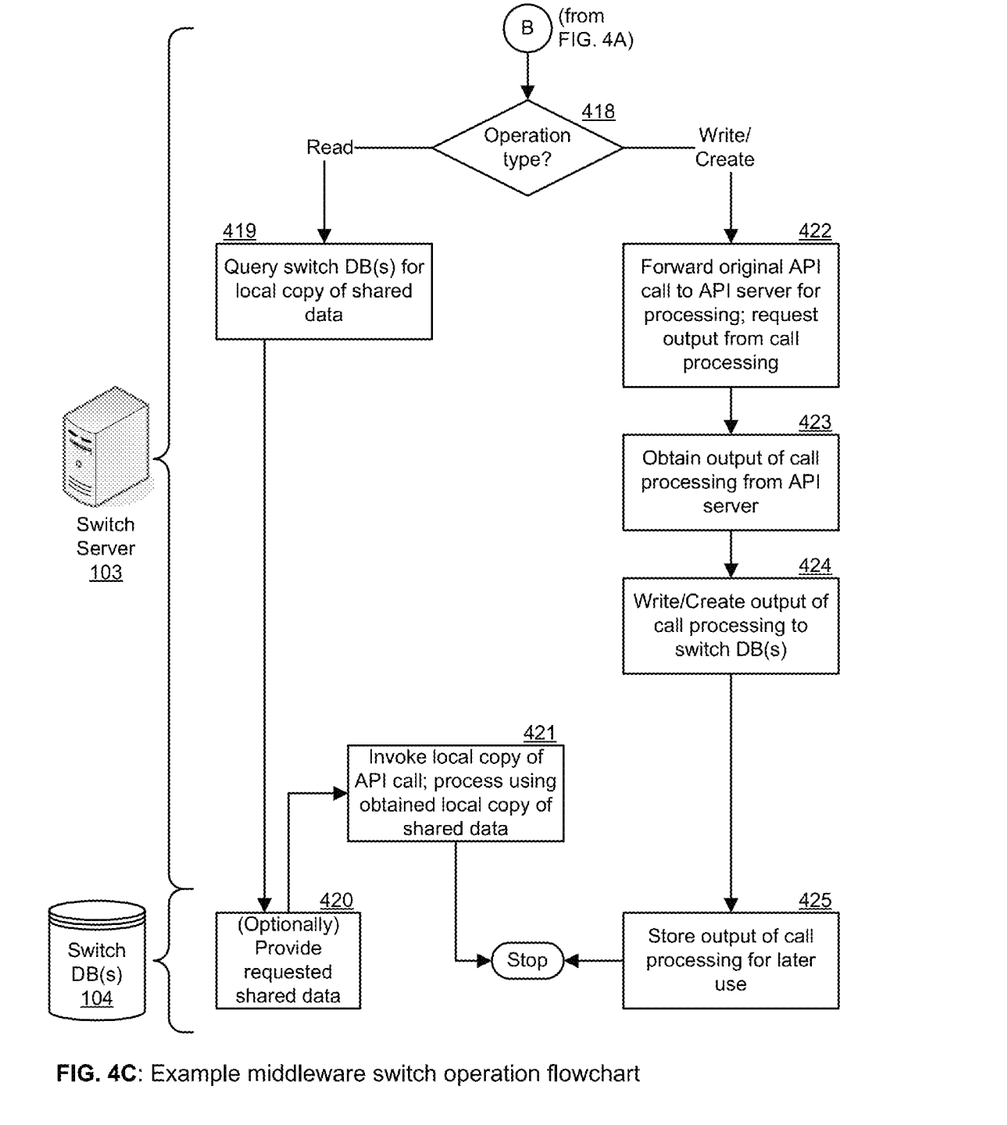

FIGS. 4A-4C illustrate an example middleware switch operation flowchart in accordance with some embodiments of the present disclosure. With reference to FIG. 4A, in some embodiments, a user 101 may provide input (see 401) into an application (e.g., an iPhone/iPad/Android app) executing on a user device 102 (e.g., a smartphone, tablet etc.). For example, the application may communicate with a web service (e.g., FIG. 1, application server 105) to provide an application feature for the user. The user device 102 may process the user input, and determine that it is required to make an API call to the application server to respond to the user input. Accordingly, the user device may generate an API call to provide to the application server (see 402). The user device may send the API call (e.g., as a HTTP POST request) for providing to the application server. An example API call is provided below:

```
POST /rest/n_apiname HTTP/1.1
Host: www.webservice1.com
Content-Type: application/x-www-form-urlencoded
Content-Length: 46
    Api_key=213456543¶m1=aedc3r4&param2=md8945
```

In some embodiments, although the API call is ultimately intended to be provided to the application server 105, the API call may be directed to a switch server 103 instead (see 403). For example, in the API call above, "www.webservice1.com" may point to switch server 103 rather than application server 105. In alternate embodiments, the API call may be addressed to the application server itself (that is, in the example above, "www.webservice1.com" may point to application server 104 itself), but the application server may be configured to execute a middleware switch software module (e.g., via a DLL) that intercepts the API call before the API call is read by a web service application executing on the application server. It is to be understood that although the disclosure hereinafter may refer to a switch server, the switch server 103 may be implemented as a standalone server, or as a process or application executing on the application server 105, or in any other configuration.

In some embodiments, the switch server 103 may obtain the API call from the user device (see 404). The switch server 103 may generate a local copy of the API call (see 405). The switch server 103 may parse the copy of the API call and extract the API name and API call parameters (see 406). For example, if the switch server 103 utilizes PHP commands, the switch server 103 may utilize the standard GET request ($_GET['param']) to extract the API call parameters from the API call. Using the API call name and/or API call parameters as inputs to a database query (e.g., using PHP/SQL commands such as SELECT), the switch server 103 may query a switch database 104 for: (a) whether the API name is listed on a defect list; (b) other API(s) with whom the API shared data; and (c) whether those API(s) are on the defect list (see 407). An example of PHP/SQL commands to query the switch database 104 using the API call name as a lookup variable is provided below:

```
<?PHP
header('Content-Type:text/plain');
mysql_connect("www.webservice1.com",$DBserver,$pass);
mysql_select_db("SWITCH.SQL");
$query="SELECT defect_flag datashare_API_list
    datashareAPI_defect_flag_list WHERE api_name =
    $apiname";
$result=mysql_query($query);
mysql_close("SWITCH.SQL");
?>
```

In some embodiments, such records may be stored in a file (e.g., a CSV, text file, etc.), as an object in memory, a hash table, etc. In some embodiments, the switch database 104 records may be stored in a secure database, and may be accessed only by the switch server 103, or the middleware switch module executing on the application server 105.

The switch server 103 may obtain the response of the switch database 103 to the switch server query. The switch server may parse the received records, and identify (a) whether the API name is listed on a defect list; (b) other API(s) with whom the API shared data; and (c) whether those API(s) are on the defect list. If the switch server 103 determines that the API name is not on the defect list (see 409, option "No"), e.g., the value of the 'defect_flag' in the pseudo-code example above is 'FALSE,' the switch server 103 may then determine whether the API shares data with an API that is on the defect list (see 410). If the switch server 103 determines that the API does not share data with any API that is on the defect list (see 410, option "No"), e.g., the value of the 'datashareAPI_defectflag_list' is 'NULL' or otherwise indicates that no API listed in 'datashare_API_list' is on the defect list, the switch server 103 may forward the original API call to the application server 105 for processing (see 411), and the middleware processing may end at that point. Should the application server 105 return results of the API call processing to the switch server 103, the switch server 103 may store the results in the switch database 104 and/or forward the results to the user device 102.

With reference to FIG. 4B, in some embodiments, if the switch server 103 determines that the API name is on the defect list (see 409, option "Yes"), e.g., the value of the 'defect_flag' in the pseudo-code example above is 'TRUE,' the switch server 103 may then determine the type of data operation the API call invokes with respect to the shared data (see 412). For example, the API call may invoke the switch server 103 to read, write, or create data that is shared by one or more other APIs. As an example, the switch server 103 may be required, for processing the API call, to read data that is created by the switch server 103 processing another API call for an API that may or may not be on the defect list. As another example, the switch server 103 may be required, for processing the API call, to write data that may be later read by the switch server 103 to process an API call for another API that may or may not be on the defect list.

If the switch server 103 determines that the type of data operation is a 'READ' operation (see 412, option "Read"), the switch server 103 may query the switch database 104 for a local copy of the shared data that is to be read for processing the API call (see 413). The switch database 104 may provide the requested data (see 414). Using the requested shared data, the switch server 103 may invoke a local copy of the API call for processing, and may utilize the obtained shared data for processing the API call locally, e.g., at the middleware switch solution rather than by the application service associated with application server 105 (see 415). If the switch server 103 determines that the type of data operation is a 'CREATE' or 'WRITE' operation (see 412, option "Write/Create"), the switch server 103 may invoke a local copy of the API call for processing, rather than forward the API call to the application service associated with application server 105 (see 415). If the local copy of the API call is invoked, the switch server 103 may write the output of the call processing to the switch database 103 (see 416), which may store the output of the call processing for later retrieval and use (see 417).

With reference to FIG. 4C, in some embodiments, if the switch server 103 determines that the API name is not on the defect list (see 409, option "No") but does share data with an API that is on the defect list (see 410, option "Yes"), the switch server 103 may then determine the type of data operation the API call invokes with respect to the shared data (see 418). If the switch server 103 determines that the type of data operation is a 'READ' operation (see 418, option "Read"), the switch server 103 may query the switch database 104 for a local copy of the shared data that is to be read for processing the API call (see 419). The switch database 104 may optionally provide the requested data (see 420). The switch server 103 may invoke a local copy of the API call for processing, and may utilize the obtained shared data for processing the API call locally, e.g., at the middleware switch solution rather than by the application service associated with application server 105 (see 421).

If the switch server 103 determines that the type of data operation is a 'CREATE' or 'WRITE' operation (see 418, option "Write/Create"), the switch server 103 may forward the original API call to the application server 105 for processing (see 422), and request the result of call processing from the application server 105. Should the application server 105 return results of the API call processing to the switch server 103 (see 423), the switch server 103 may store the results in the switch database 104 (see 424-425). For example, the switch server 103 may write the output of the call processing to the switch database 103 (see 424), which may store the output of the call processing for later retrieval and use (see 425).

The above stated method operations are presented in an algorithm written in pseudo-code below. The algorithm may be implemented using a computer programming language as software that runs on a computer system, such as described below with reference to FIG. 5.

```
Procedure API_Call_Switching_Logic( )
Input: API_name; API_Parameters_input;
    API_Operation_Type
Output: API_Parameters_output;
        /* API_Operation_Type = Read / Write / Create */
Begin
API_Category = API_Defect_Table (API_Name);
If API_Category == Defective_API Then
    Switch (API_Operation_Type)
    Read:           Local_Copy_Response( );
    Write:          If no Local_Copy then Create Local
      Copy( );
    Write_to_Local_Copy( );
    Create:         Create_Local_Copy( );
    End_Switch( );
If API_Category == Non_Defective_API_Disjoint_Data
    Then
    Invoke (API_Name; API_Parameters_input;
    API_Parameters_Output) to remote web service;
    Return response from remote web service;
    End_If( );
If API_Category == Non_Defective_API_Shared_Data Then
    Switch (API_Operation_Type)
    Read:           Local_Copy_Response( );
    Write:          If no Local_Copy Then Create Local
      Copy( );
        Write to Local_Copy( );
        Invoke (API_Name; API_Parameters_input;
            API_Parameters_Output) to remote web
    service;
        Return response from remote web service;
    Create:         If no Local_Copy Then Create Local
      Copy( );
        Invoke (API_Name; API_Parameters_input;
            API_Parameters_Output) to remote web
    service;
    End_Switch( );
End;
Procedure Local_Copy_Response( )
Step 1: Access and retrieve the referred data item
    from the Local Copy DB
Step 2: If applicable, process the referred data using
    Application Business Logic
Step 3: Response = Output from the Application
    Business Logic
End( );
Procedure Create_Local_Copy( )
Step 1: If applicable, process the referred data using
    Application Business Logic
Step 2: Object to create = Output from the Application
    Business Logic
Step 3: Access the Local Copy DB, and create the
    Object
End( );
Procedure Write_Local_Copy( )
Step 1: If applicable, process the referred data using
    Application Business Logic
Step 2: Object to write = Output from the Application
    Business Logic
Step 3: Access the Local Copy DB, and write the Object
End( );
```

The embodiments above in the current disclosure are targeted to fix defects from outside of the defective black-box software. However, this concept is also extensible to providing other value-add to the black-box software, which might be deficient in other defect-unrelated issues. One such example is being deficient in SDLC (software development life-cycle) artifacts. If the black-box software is developed in an ad-hoc manner, without adequate SDLC artifacts, or in a merger & acquisition scenario where the SDLC artifacts are simply unavailable—then the proposed concepts can be used to build and provide the missing SDLC artifacts. For example, box 103 in FIG. 1, and likewise box 204 in FIG.

2 can be an SDLC accelerator in some embodiments, which can retrofit the missing SDLC artifacts to the otherwise deficient black-box software.

Embodiments of the disclosure may differentiate the API call processing logic using the nature (Read, Write, or Create) of the API call. For non-defective APIs with shared data (with defective APIs)—the implementation may use reference to both local copy as well as remote web services' maintained copies of the data set. Shared data analysis may be made per atomic data items as referenced in the API call parameters list. However, this approach of shared data analysis on per atomic data item may become micromanagement of the local stored copies as well as repeated/frequent calls to the remote web services. Indeed, it is possible to group a number of data items into a single cluster and make a single DB call or single call to the remote web services, to reduce the call-processing overhead. In such designs, a cluster of API calls may be processed together, each logically following the system and method described above, however, the actual (Read/Write/Create) requests to the local storage or to the remote web services may be combined. Exemplary benefits could include performance gain and reduced database overhead.

Embodiments of the present disclosure are API call reference based. The target defective black-box software may be hosted as a remote web service, and the references to the defective software may be API calls. API calls may be intercepted in transit to determine if a fix is required, and the fix solution may be rendered in real-time. However, this idea is not limited to API calls only. The idea is perfectly scalable to client-server messaging domain. If the target defective software is hosted as a "Server" to/with which the clients communicate via messaging (i.e., non-web based request/response), then a gateway for message processing can be implemented analogous to the API call processing switch. The messaging gateway may, likewise, make a distinction between defective calls vis-à-vis non-defective, but shared, data calls vis-à-vis non-defective and data disjoint calls. The call processing logic may be analogous and equivalent, however, the specific implementation details would depend on the messaging platform, instead of HTTP or HTTPS protocol.

Embodiments of the present disclosure target defective black-box software, either in API reference format or in client-server messaging format, by directly intervening the API calls or the message requests. This may be a direct 1:1 caller-to-called relationship tracking system. The design and the underlying ideas of fixing a black-box defective software can be scaled from 1:1 to 1:many environments. In this model, multiple (N) defective black-box software—each with its own defect list—may be processed at a central call-processing switch. In addition to the call processing logic of differentiating based upon defective (or, not) nature of the APIs and API operation type (Read/Write/Create)—there may also be a first level switch which steers the call to anyone of the N different and distinct black-box defective software that are being processed. Logically, the central processing switch becomes a grand OR (i.e., Union) operation over the call processing switches for each respective black-box defective software. This implementation can be useful if the current invention is being designed and deployed as a scalable service-add-ON for fixing defects in any black-box defective software.

Computer System

Figure 5:
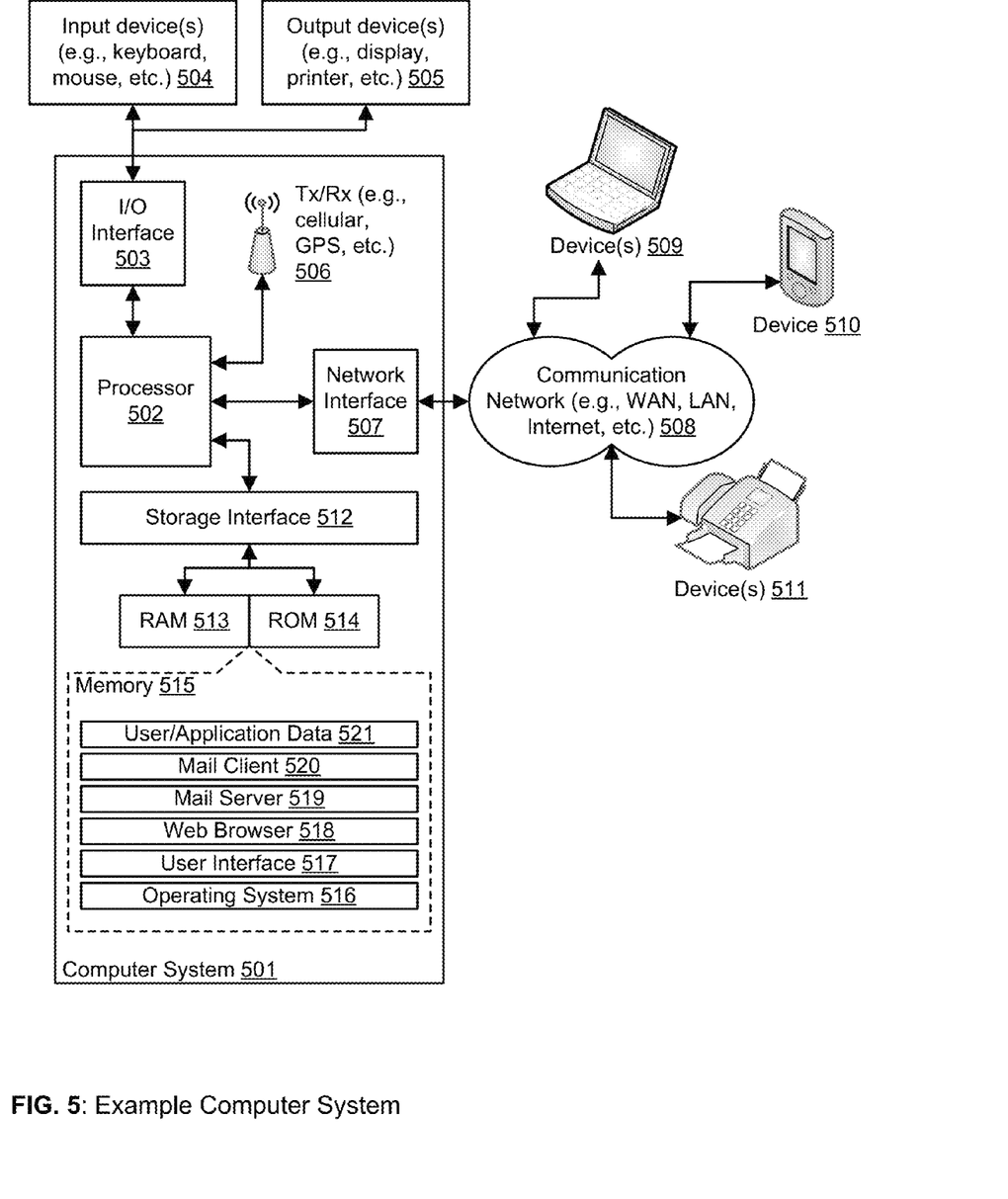
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing user device 102, switch server 103, application server 105, middleware switch 201, caller 211, test process 212, remote web service 214, or the like. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, switch database 104, API defect table 203, local copy 206, or the like.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., API defect table 203, shared data analysis unit 202, API call processing switching logic 204, application business logic 205, local copy 206, or the like) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for fixing software defects in a binary or executable file. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A software defect management system, comprising:
   a processor; and
   a memory disposed in communication with the processor and storing processor-executable instructions comprising instructions for:
   obtaining, from a user device, an application programming interface call for a black-box software application, wherein the black-box software application is associated with an application server located separately from the software defect management system;
   determining whether the black-box software application is configured in a defective manner to process the application programming interface call;
   identifying a call processing application to process the application programming interface call, based on determining whether the black-box software application is configured in a defective manner to process the application programming interface call, wherein the software defect management system bypasses the application server for processing the application programming interface call if it is determined that the black-box software application is configured in a defective manner; and
   providing the application programming interface call for the identified call processing application.

2. The system of claim 1, wherein the black-box software application is an executable file.

3. The system of claim 1, wherein the black-box software application is stored on a computer that is remote from the system.

4. The system of claim 3, wherein the application programming interface call is obtained via a network interface device.

5. The system of claim 4, wherein the black-box software application is a web service application.

6. The system of claim 1, wherein the determination of whether the black-box software application is configured in a defective manner to process the application programming interface call is based on whether previously obtained call processing result data from the black-box software application in response to the application programming interface call matches expected call processing result data.

7. The system of claim 1, wherein determining whether the black-box software application is configured in a defective manner to process the application programming interface call is performed by querying a call processing defect database storing black-box software application test data.

8. The system of claim 1, wherein the black-box software application is identified as the call processing application, after determining that the black-box software application is not configured in a defective manner to process a list of application programming interface calls.

9. The system of claim 1, wherein a replacement application other than the black-box software application is identified as the call processing application, after determining that the black-box software application is configured in a defective manner to process a list of application programming interface calls.

10. The system of claim 9, wherein the replacement application is locally stored.

11. The system of claim 9, wherein the application programming interface call is provided for the replacement application via a network interface device.

12. The system of claim 9, wherein the replacement application is a web service application.

13. The system of claim 1, wherein the application programming interface call is provided for the identified call processing application substantially in real-time.

14. The system of claim 1, wherein is it determined that the black-box software application is not configured in a defective manner to process the application programming interface call, the instructions further comprising instructions for:
    determining whether processing the application programming interface call by the black-box software application utilizes data shared with at least another call processing application.

15. The system of claim 14, wherein it is determined that processing the application programming interface call by the black-box software application does not utilize data shared with at least another application programming interface call, and wherein the black-box software application is identified as the call processing application after it is determined that processing the application programming interface call by the black-box software application does not utilize data shared with at least another call processing application.

16. The system of claim 14, wherein it is determined that processing the application programming interface call by the black-box software application utilizes data shared with at least another application programming interface call, the instructions further comprising instructions for:
    identifying a shared data location for the data shared with the at least one application programming interface call; and
    performing at least one of: a read operation, a create operation, or a write operation, associated with the shared data location, for processing the application programming interface call.

17. The system of claim 16, wherein the shared data location is stored locally.

18. A software defect management method, comprising:
    obtaining, from a user device, an application programming interface call for a black-box software application, wherein the black-box software application is associated with an application server located separately from a software defect management system;
    determining, via a processor, whether the black-box software application is configured in a defective manner to process the application programming interface call;
    identifying, via the processor, a call processing application to process the application programming interface call, based on determining whether the black-box software application is configured in a defective manner to process the application programming interface call, wherein the software defect management system bypasses the application server for processing the application programming interface call if it is determined that the black-box software application is configured in a defective manner; and
    providing the application programming interface call for the identified call processing application.

19. A non-transitory computer-readable medium storing computer-executable software defect management instructions comprising instructions for:
- obtaining, from a user device, an application programming interface call for a black-box software application, wherein the black-box software application is associated with an application server located separately from a software defect management system;
- determining, via a processor, whether the black-box software application is configured in a defective manner to process the application programming interface call;
- identifying, via the processor, a call processing application to process the application programming interface call, based on determining whether the black-box software application is configured in a defective manner to process the application programming interface call, wherein the software defect management system bypasses the application server for processing the application programming interface call if it is determined that the black-box software application is configured in a defective manner; and
- providing the application programming interface call for the identified call processing application.

* * * * *